US006381413B1

(12) United States Patent
Harada (10) Patent No.: US 6,381,413 B1
(45) Date of Patent: Apr. 30, 2002

(54) DISTANCE MEASURING DEVICE

(75) Inventor: Osamu Harada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 09/630,653

(22) Filed: Aug. 2, 2000

(30) Foreign Application Priority Data

Aug. 2, 1999 (JP) .......................................... 11-228077

(51) Int. Cl.[7] ............................................ G03B 13/36
(52) U.S. Cl. .............................. 396/80; 396/92; 396/96; 396/109; 396/121
(58) Field of Search .......................... 396/109, 96, 106, 396/121, 104, 80, 92, 91, 122, 123

(56) References Cited

U.S. PATENT DOCUMENTS

| 5,214,467 A | * | 5/1993 | Yoshida et al. ............. 396/123 |
| 5,721,977 A | * | 2/1998 | Yamakawi et al. ........... 396/92 |
| 5,805,939 A | * | 9/1998 | Hamamura et al. ......... 396/123 |
| 6,192,198 B1 | * | 2/2001 | Kitani et al. .............. 396/80 X |

* cited by examiner

Primary Examiner—W. B. Perkey
(74) Attorney, Agent, or Firm—Robin, Blecker & Daley

(57) ABSTRACT

An active-type multipoint automatic focusing apparatus is arranged to vary the number of distance measuring points according to focal length, and to vary, according to the number of distance measuring points varied, the number of times of light projection to be made by a light projecting part for a distance measuring action at each of the distance measuring points.

22 Claims, 8 Drawing Sheets

| | LIGHT EMITTING ELEMENT TO BE USED FOR DISTANCE MEASUREMENT | Nmax |
|---|---|---|
| $Zp \leq Zp1$ | C, R1, L1, R2, L2 | Na |
| $Zp > Zp1$ | C, R1, L1 | $Nb \leq (5/3) \times Na$ |

ON CONDITION THAT Na<Nb

FIG.5(b)

| | LIGHT EMITTING ELEMENT TO BE USED FOR DISTANCE MEASUREMENT | Nmax |
|---|---|---|
| $Zp \leq Zp1$ | C, R1, L1, R2, L2 | Na |
| $Zp1 < Zp \leq Zp2$ | C, R1, L1 | $Nb \leq (5/3) \times Na$ |
| $Zp > Zp2$ | C | $Nc \leq 5 \times Na$ |

ON CONDITION THAT Na<Nb<Nc

FIG.5(c)

| | LIGHT EMITTING ELEMENT TO BE USED FOR DISTANCE MEASUREMENT | Nmax |
|---|---|---|
| $E \leq E1$ | C, R1, L1, R2, L2 | Na |
| $E > E1$ | C, R1, L1 | $Nb \leq (5/3) \times Na$ |

ON CONDITION THAT Na<Nb

FIG.5(d)

| | $Zp \leq Zp1$ | | $Zp > Zp1$ | |
|---|---|---|---|---|
| | LIGHT EMITTING ELEMENT TO BE USED FOR DISTANCE MEASUREMENT | Nmax | LIGHT EMITTING ELEMENT TO BE USED FOR DISTANCE MEASUREMENT | Nmax |
| $E \leq E1$ | C, R1, L1, R2, L2 | Na | C, R1, L1 | $Nb \leq (5/3) \times Na$ |
| $E > E1$ | C, R1, L1 | $Nb \leq (5/3) \times Na$ | C | $Nc \leq 5 \times Na$ |

ON CONDITION THAT Na<Nb<Nc

DISTANCE MEASURING DEVICE

BACKGROUND OF THE INVENTION

1. Field of the Invention

The present invention relates to an improvement on a multipoint distance measuring device arranged to compute distance measuring information for a plurality of distance measuring points and a camera having the multipoint distance measuring device.

2. Description of Related Art

Some of known cameras are arranged to permit the user to vary the focal length of a photo-taking optical system of the camera from one focal length over to another as desired according to the composition of a picture of an object of shooting. Meanwhile, it is known that an active-type distance measuring device is arranged to project a light flux onto a distance measuring object from a light emitting element and to measure a distance to the object by receiving a reflection light flux reflected by the object as a result of the light projection.

It is also known that some cameras are provided with a multipoint distance measuring device. The multipoint distance measuring device is arranged to permit taking a picture of a desired object in an in-focus state in whatever position the object may be located on a photo-taking image plane, by setting a plurality of distance measuring points on the photo-taking image plane in the horizontal direction of the photo-taking image plane.

Figure 8:
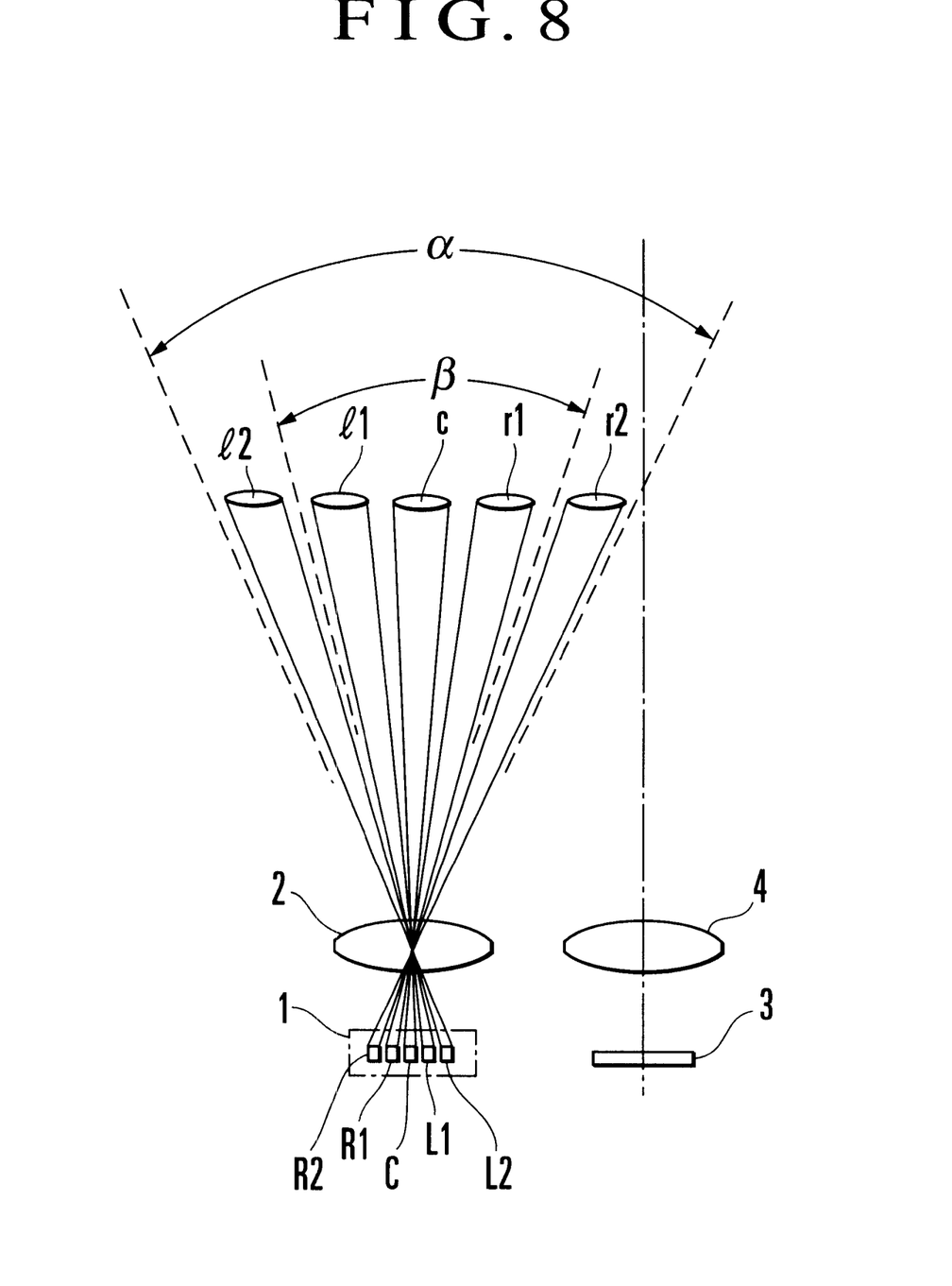
FIG. 8 shows, by way of example, the arrangement of a conventional multipoint distance measuring device used for an automatic focusing camera.

FIG. 8 shows, by way of example, a multipoint distance measuring device adapted for an automatic-focusing type camera. Referring to FIG. 8, a light emitting element array 1 is composed of a plurality of light emitting elements R2, R1, C, L1 and L2. A light projecting lens 2 is arranged to project light fluxes generated by the light emitting elements R2 to L2 respectively toward distance measuring targets r2, r1, c, l1 and l2 which are arranged side by side in the horizontal direction of a photo-taking image plane. A light receiving element 3 which is, for example, a PSD (a semiconductor position detector) is arranged to output a signal which varies according to the incident position of a light flux incident thereon. A light receiving lens 4 is arranged to cause a light flux reflected by an object located in each of the distance measuring targets as a result of the light projection to be led to the light receiving element 3. In the case of this example, the light emitting elements R2 to L2 are time-serially lighted up one after another. Information on a distance to each of the distance measuring targets r2 to l2 is obtained from the light receiving element 3 with the light emitting elements R2 to L2 lighted up. With the multipoint distance measuring device arranged in this manner, an automatic focusing action can be appositely carried out irrespective of the position of the object within the photo-taking image plane.

However, if such a camera is made to have the focal length of its photo-taking optical system arranged to be variable, a problem arises as follows.

In the variable-focal-length camera (hereinafter will be referred to as a zoom camera), the photo-taking angle of view varies with the change-over of focal length of the photo-taking optical system. When the zoom camera is arranged to perform an automatic focusing action in the above-stated manner, therefore, an object located outside the photo-taking image plane might be included in the distance measuring objects. As shown in FIG. 8, a photo-taking angle of view β on the side of longer focal length of the photo-taking optical system is narrower than the photo-taking angle of view α on the side of shorter focal length. Therefore, if a plurality of distance measuring targets r2 to l2 are set in such a manner as to correspond to the photo-taking angle of view α, objects located outside the photo-taking angle of view β, i.e., objects within the distance-measuring targets r2 and l2, come to be included in the distance measuring objects at a longer focal length. Under such a condition, the result of distance measurement might be caused to be erroneous by inclusion of information on the unnecessary distance measurement. Besides, in such a case, electric energy is wasted by unnecessarily lighting up the light emitting elements R2 and L2.

To solve this problem, a zoom camera disclosed in Japanese Patent Publication No. Hei 3-80290 is arranged such that, when the focal length of the zoom camera is changed over to a longer focal length, a distance measuring action on a distance measuring target located outside the range of multipoint distance measurement is inhibited. In other words, in the case of FIG. 8, when the focal length of the photo-taking optical system corresponds to the angle of view β, distance measuring actions with the light emitting elements R2 and L2 are inhibited.

The multipoint distance measuring device of the conventional zoom camera is arranged to minimize a period of time required for multipoint distance measurement over the wide range of view on the shorter focal length side and yet to be capable of adequately carrying out a distance measuring action on the longer focal length side.

Some of zoom cameras of these days are arranged to have a telephoto function. The camera of that kind must be capable of measuring distances up to a long distance.

However, on the contrary, cameras are required to be compact in size. This requirement causes reduction in size of the distance measuring optical system and also in battery capacity. As a result, it has become difficult to obtain a sufficient amount of signal, i.e., to obtain an adequate distance measuring capability.

In addition to the focal length, a shot noise due to external light (disturbance noise) is considered also to be one of factors affecting the distance measuring capability. Within an area where the distance measuring capability is affected by the shot noise, the distance measuring capability lowers accordingly as the amount of external light increases, with signal components assumed to be unvarying. In a case where the amount of external light is large, the distance measuring capability of the multipoint distance measuring device becomes insufficient at all distance measuring points, and it tends to become impossible to obtain sufficiently-reliable values of distance measurement.

This problem may be solved by increasing a distance measuring period of time per distance measuring point. Such a solution, however, causes a total period of time required in measuring distances at all points of the multipoint distance measurement to become too long in a case where there are many distance measuring points. Such a long distance measuring period of time tends to cause the user of the camera to miss a shutter-operating opportunity or to take a blurred picture due to image shaking.

BRIEF SUMMARY OF THE INVENTION

In accordance with an aspect of the invention, there is provided an automatic focusing apparatus arranged to project light onto objects caught at a plurality of detecting areas in respective different directions, to receive, at a light receiving part, reflected light resulting from the light projection and to compute data for focusing on the basis of an output of the light receiving part resulting from the light projection on each object, the automatic focusing apparatus comprising a varying circuit which varies the number of the detecting areas, and a setting circuit which sets a maximum period of time required for computing the data, according to the number of the detecting areas varied by the varying circuit, in such a way as to make the length of distance measuring time and the distance measuring capability of the automatic focusing apparatus adequate.

In accordance with another aspect of the invention, there is provided an automatic focusing apparatus arranged to project light onto objects caught at a plurality of detecting areas in respective different directions, to receive, at a light receiving part, reflected light resulting from the light projection and to compute data for focusing on the basis of an output of the light receiving part resulting from the light projection on each object, the automatic focusing apparatus comprising a light projecting circuit which causes the light projection to be repeatedly made on the object located at each of the detecting areas, a varying circuit which varies the number of the detecting areas, and a setting circuit which sets a maximum number of times of the light projection caused by the light projecting circuit for each detecting area, according to the number of the detecting areas varied by the varying circuit, in such a way as to make the length of distance measuring time and the distance measuring capability of the automatic focusing apparatus adequate.

In accordance with a further aspect of the invention, there is provided an automatic focusing apparatus arranged to project light onto objects caught at a plurality of detecting areas in respective different directions, to receive, at a signal-storing-type light receiving part, reflected light resulting from the light projection and to compute data for focusing on the basis of an output of the light receiving part resulting from the light projection on each object, the automatic focusing apparatus comprising a varying circuit which varies the number of the detecting areas, and a setting circuit which sets a maximum period of time for storing a signal at the light receiving part, according to the number of the detecting areas varied by the varying circuit, in such a way as to make the length of distance measuring time and the distance measuring capability of the automatic focusing apparatus adequate.

These and other aspects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

First Embodiment

Figure 1:
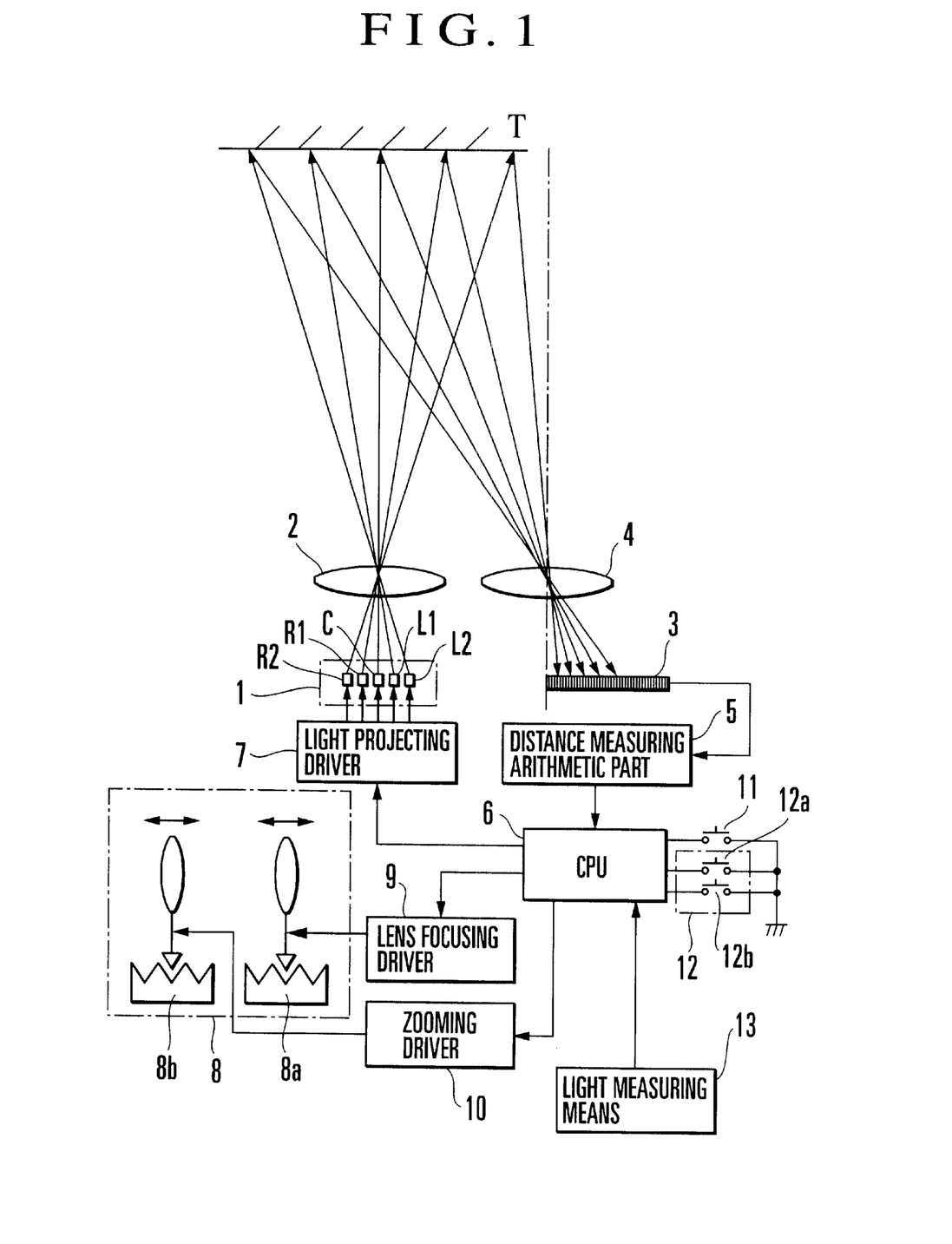
FIG. 1 is a schematic diagram showing the arrangement of an automatic focusing camera having a variable focal length, according to each of first to third embodiments of the invention

FIG. 1 is a schematic diagram showing the arrangement of an automatic focusing camera having a variable focal length, according to a first embodiment of the invention. Referring to FIG. 1, a light emitting element array 1 includes light emitting elements R2, R1, C, L1 and L2. An infrared light emitting element (IRED) or a visible light emitting element (LED) or the like is used for each of these light emitting elements. A light projecting lens 2 is arranged to project a light flux generated by each of the light emitting elements R2 to L2 toward an object of shooting T. A light receiving element 3 is arranged to output a signal which varies according to the incident position of an incident light flux. The light receiving element 3 is, for example, composed of a solid-state image sensor (CCD) or a semiconductor position detecting element (PSD). In the case of the first embodiment, the light receiving element 3 is assumed to be a CCD array. A light receiving lens 4 is arranged to lead a reflected light flux obtained with the projected light flux reflected by the object T to the light receiving element 3.

A distance measuring arithmetic part 5 is arranged to compute either a distance to the object T or a value corresponding to the distance, on the basis of the output of the light receiving element 3. A CPU 6 is arranged to monitor the operating states of all parts of the camera and controls their actions. A light projecting driver 7 is arranged to cause each of the light emitting elements of the light emitting element array 1 to emit light. A lens barrel part 8 is composed of a lens focus driving part 8a arranged to be driven for focusing on the surface of a photographic film (not shown) and a zoom driving part 8b arranged for change-over of the focal length of a photo-taking optical system by operating a zoom switch 12. The lens focus driving part 8a is driven by a lens focusing driver 9. The zoom driving part 8b is driven by a zooming driver 10.

A release switch 11 is provided for causing the camera to begin a sequence of photo-taking actions by turning the release switch 11 on (by short-circuiting). The zoom switch 12 is provided for allowing the user to adjust the focal length of the photo-taking optical system to a suitable picture composition. The zoom switch 12 is composed of two switch parts 12a and 12a and is arranged, for example, as follows. When the switch part 12a is turned on, the zoom driving part 8b is caused through the CPU 6 and the zooming driver 10 to move toward a longer focal length position. When the other switch part 12a is turned on, the zoom driving part 8b is caused through the CPU 6 and the zooming driver 10 to move toward a shorter focal length position. Light measuring means 13 is provided for measuring the luminance of the object of shooting. A period of time of an exposure of the photographic film is decided according to the result of the light measurement.

The photo-taking operation of the camera shown in FIG. 1 is next described.

Figure 2:
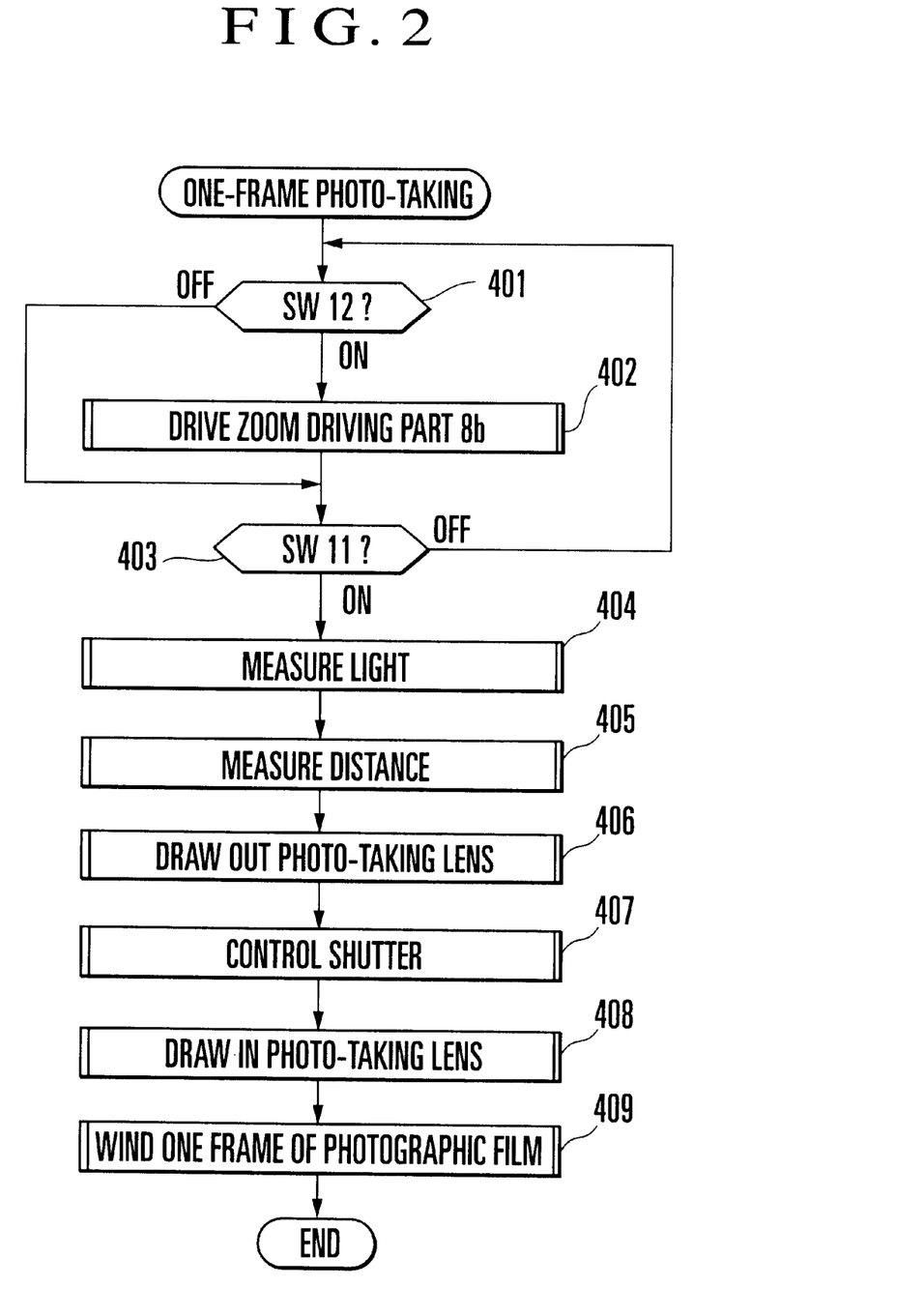
FIG. 2 is a flow chart showing an ordinary photo-taking operation to be performed on one frame portion of a film by the camera shown in FIG. 1.

FIG. 2 is a flow chart showing an ordinary photo-taking operation to be performed on one frame portion of the film by the camera shown in FIG. 1.

At a step 401 of FIG. 2, a check is made for the state of the zoom switch 12. If either the switch part 12a or the switch part 12a is found to be in an on-state, the flow of operation proceeds from the step 401 to a step 402. At the step 402, the zoom driving part 8b is driven toward a longer focal length position or a shorter focal length position. The flow then proceeds from the step 402 to a step 403. On the other hand, if the switch 12 is found at the step 401 to be in an off-state, the flow proceeds from the step 401 directly to the step 403 as it is unnecessary to drive the zoom driving part 8b. At the step 403, a check is made for the state of the release switch 11. If the release switch 11 is in an off-state, it indicates that no photo-taking operation is performed and the camera is in a standby state for photo-taking. Then, the flow returns from the step 403 to the step 401 to monitor the state of the zoom switch 12. If the release switch 11 is found at the step 403 to be in an on-state, the flow proceeds to a step 404 to execute a sequence of photo-taking actions.

Figure 3:
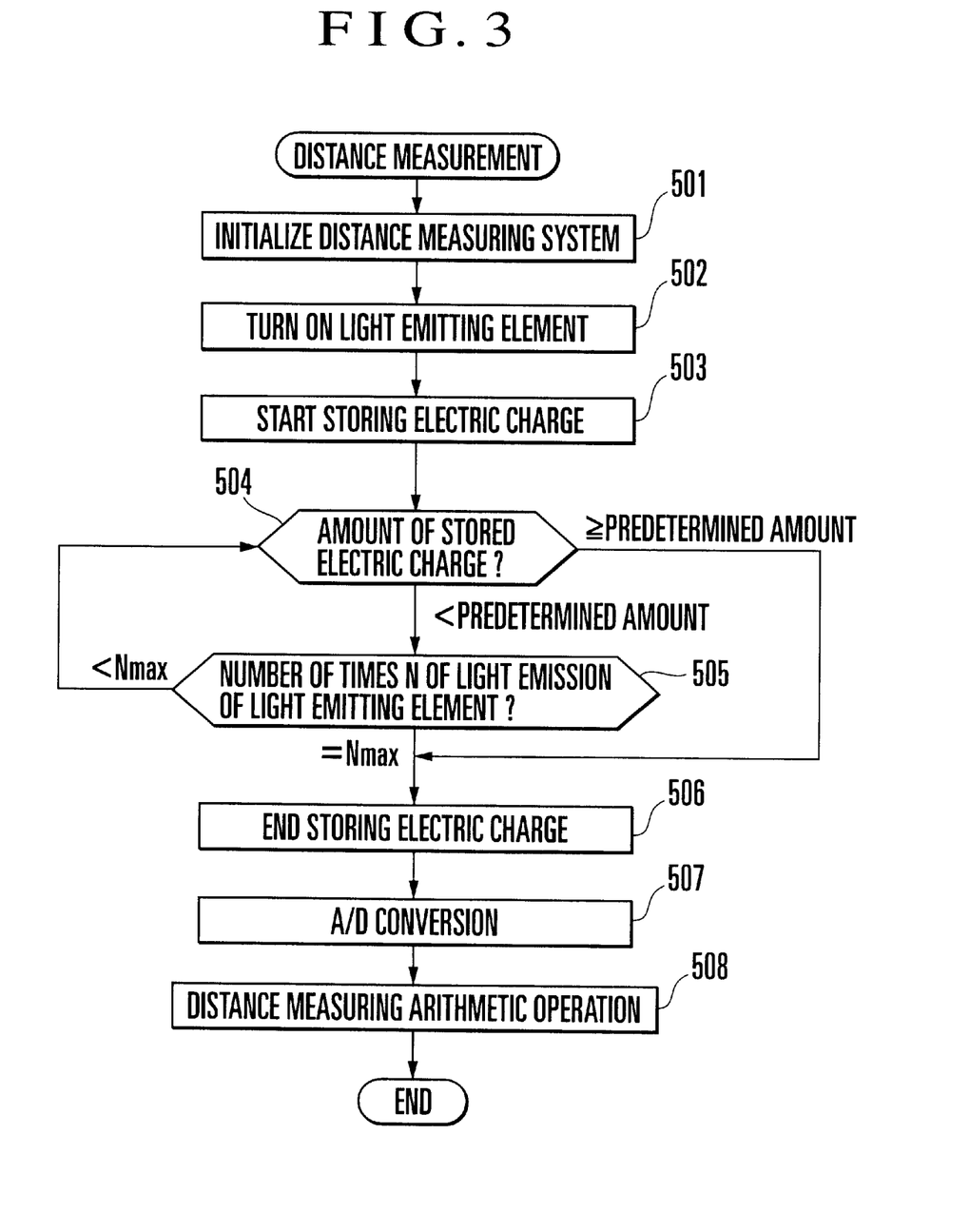
FIG. 3 is a flow chart showing a distance measuring action to be performed with one light emitting element in a multipoint distance measuring device according to the first embodiment of the invention.

At the step 404, with the release switch 11 turned on, the brightness or luminance of the object of shooting is first measured by the light measuring means 13. At the next step 405, a distance measuring action is performed to output a distance to the object of shooting or a value corresponding to the distance. The distance measuring action is performed by causing predetermined light emitting elements of the light emitting element array 1 to light up in time series, receiving, at the light receiving element 3, light resulting from the light emission, computing, at the distance measuring arithmetic part 5, each of outputs of the light receiving element 3 thus obtained to obtain a plurality of measured distance values, and selecting, as a result of the distance measurement, one of the measured distance values which is considered to be most likely representing a main object of shooting among others. FIG. 3 shows in a flow chart the distance measuring action to be performed by one of the light emitting elements.

Referring to FIG. 3, at a step 501, the light receiving element 3, which is a CCD array, is first initialized by removing electric charge remaining there. At a step 502, one of the light emitting elements of the light emitting element array 1 is lighted up in a pulse-like manner by the light projecting driver 7. At the next step 503, reflected light from the object T is received by the light receiving element 3 to store electric charge. At steps 504 and 505, the amount of electric charge stored by the light receiving element 3 and the number of times N of light emission by the light emitting element are monitored and checked. The light receiving element 3 is allowed to keep on doing the electric-charge storing action either until the amount of stored electric charge becomes equal to or larger than a predetermined amount or until the number of times N of (repeating) light emission of the light emitting element reaches a predetermined number of times. The check for the amount of stored electric charge is made by comparing the output of the light receiving element 3 with a predetermined amount by some suitable comparison means, such as a comparator (not shown).

When the amount of stored electric charge becomes equal to or larger than the predetermined amount or when the number of times N of light emission of the light emitting element reaches the predetermined number of times Nmax, the flow proceeds to a step 506 to terminate the electric-charge storing action. At the next step 507, a signal from the light receiving element 3 is A/D (analog-to-digital) converted. At a step 508, a distance to the object T or a value corresponding to the distance (distance measurement information) is computed from the output of the light receiving element 3.

The distance measuring action with one light emitting element is as described above. In the case of the multipoint distance measuring arrangement, the same action is performed with each of a plurality of light emitting elements, and the most apposite measured distance value is selected from among the values thus obtained.

Again referring to FIG. 2, at a step 406, the lens focus driving part 8a is driven by the lens focusing driver 9 according to the result of distance measurement obtained in such a way as to have an in-focus state obtained on the photographic film surface (not shown) through the lens barrel part 8. At the next step 407, the photographic film is exposed to light for an apposite period of time decided on the basis of the measured light value obtained at the step 404. The flow then proceeds from the step 407 to a step 408. At the step 408, the position of the lens focus driving part 8a is brought back to its initial position by drawing the photo-taking lens inward. At a step 409, the photographic film is wound to an extent corresponding to one frame portion thereof, and the photo-taking operation comes to an end.

The multipoint distance measuring operation of the above-mentioned camera is next described.

Figure 4:
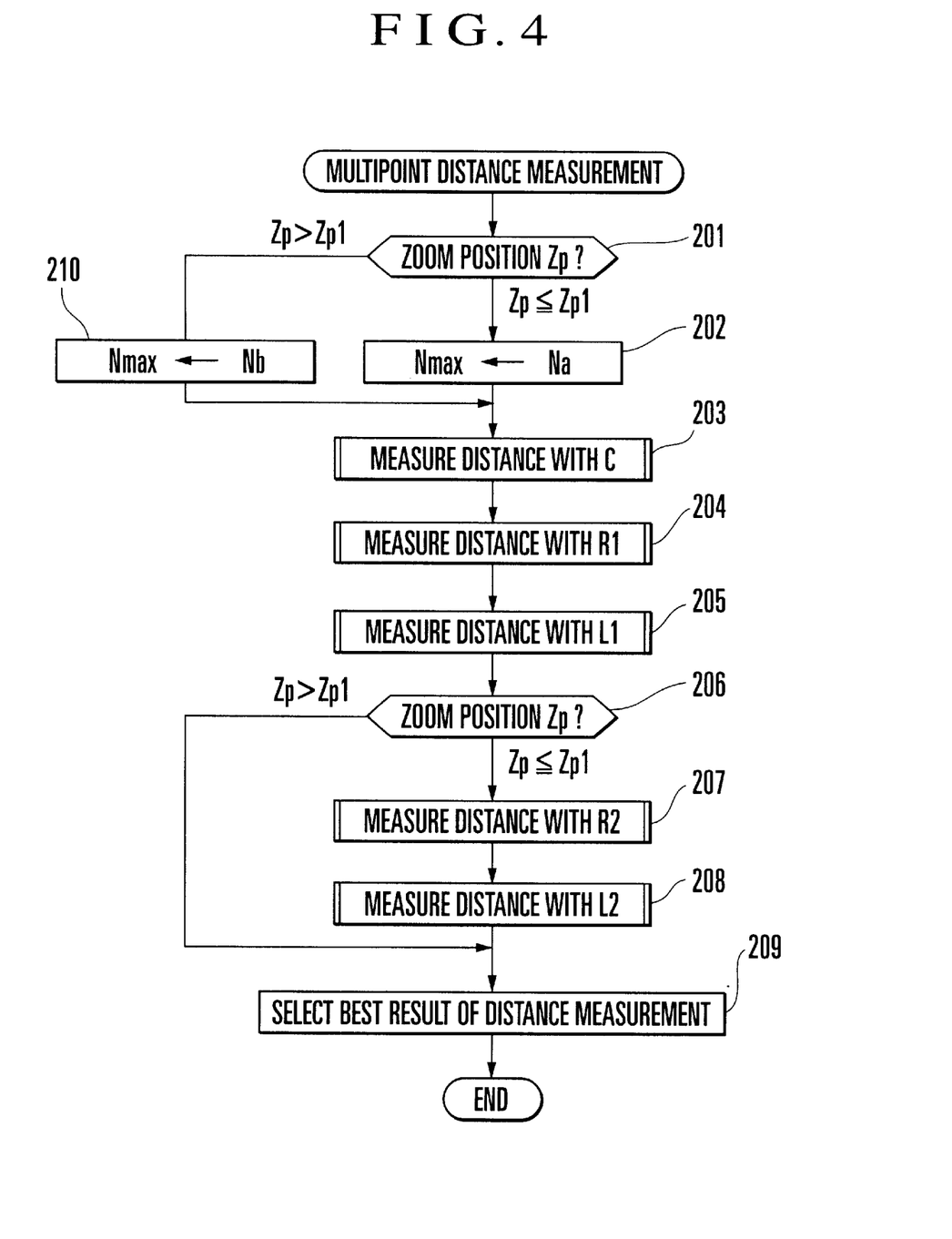
FIG. 4 is a flow chart showing a distance measuring action to be performed by the multipoint distance measuring device according to the first embodiment of the invention.

FIG. 4 is a flow chart showing the multipoint distance measuring operation. At a step 201 of FIG. 4, a check is made for the current position of the zoom driving part 8b shown in FIG. 1, i.e., a zoom position Zp. If the zoom position Zp is found to be on the shorter focal length side of a predetermined zoom position Zp1, the flow proceeds to a step 202. At the step 202, the maximum number of times Nmax of light emission of each light emitting element is set to a first predetermined number of times Na. On the other hand, if the zoom position Zp is found to be on the longer focal length side of the predetermined zoom position Zp1, the flow proceeds from the step 201 to a step 210. At the step 210, the maximum number of times Nmax of light emission of each light emitting element is set to a second predetermined number of times Nb.

The relation between the first predetermined number of times Na and the second predetermined number of times Nb is expressed as "Na<Nb", which is set on the following condition:

$$Na \times (\text{the number of distance measuring points to be used}) \approx Nb \times (\text{the number of distance measuring points to be used}) \quad (1)$$

For example, in the first embodiment, if the zoom position Zp is on the shorter focal length side of the predetermined zoom position Zp1, the light emitting elements C, R1, L1, R2 and L2 are used for the distance measurement, so that the number of distance measuring points to be used is five. If the zoom position Zp is on the longer focal length side of the predetermined zoom position Zp1, the light emitting elements C, R1 and L1 are used for the distance measurement, so that the number of distance measuring points to be used is three. With this element applied to the above formula (1), there are obtained the following relation:

Na×5≈Nb×3

Nb≈(5/3)×Na

Therefore, the number of times of light emission per light emitting element when the zoom position Zp is on the longer focal length side of the predetermine zoom position Zp1 can be set to approximately 1.7 times as many as the number of times to be set when the zoom position Zp is on the shorter focal length side of the predetermined zoom position Zp1.

In the case of Formula (1) above, the left and right terms are expressed to be approximately equal to each other (≈). However, this formula may be changed to the following inequality:

Na×(the number of distance measuring points to be used)≧Nb× (the number of distance measuring points to be used)    (1)'

Figure 5A:
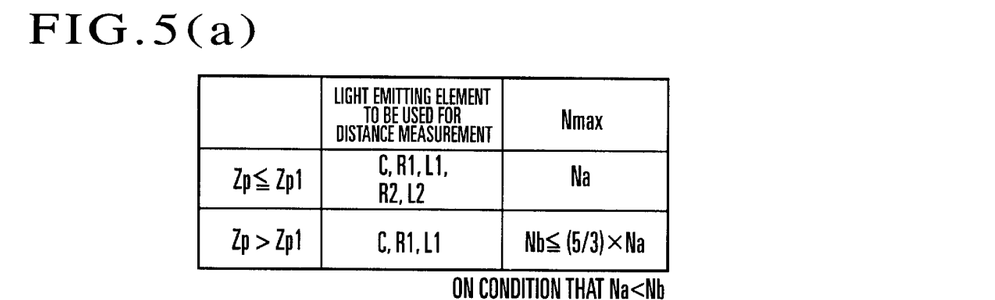
FIGS. 5(a) to 5(d) are diagrams showing, according to the first to third embodiments of the invention, the relationship of light emitting elements to be used for distances measurement and the number of times of light emission to be made per light emitting element to the respective zoom positions, and the relationship of light emitting elements to be used for distances measurement and the number of times of light emission to be made per light emitting element to external light luminance.

In the case of Formula (1)' above, when the number of distance measuring points to be used is lessened, the number of times of light emission may be set according to a distance measuring capability required. FIG. 5(a) shows the thus-obtained relationship of the light emitting elements to be used for the distance measurement and the number of times of light emission per light emitting element to the zoom position Zp.

At a step 203, the distance measuring action is performed with the light emitting element C of the light emitting element array 1. This distance measuring action is performed as described above with reference to the flow chart of FIG. 3. Therefore, the details of this action are omitted from the description given here. At steps 204 and 205, the distance measuring action is also performed with other light emitting elements R1 and L1, respectively. At the next step 206, a check is made for the zoom position Zp. If the zoom position Zp is found to be on the longer focal length side of the predetermined zoom position Zp1, the flow proceeds to a step 209, as the distance measurement is not performed with the light emitting elements R2 and L2. At the step 209, a measured distance value which is considered to be best representing a distance to a main object of shooting among the measured distance values obtained with the light emitting elements C, R1 and L1 is selected. This selection may be made either by giving priority to a nearer distance or by attaching weight to the values and the measuring points in comparing them.

If the zoom position Zp is found at the step 206 to be on the shorter focal length side of the predetermined zoom position Zp1, the flow proceeds to steps 207 and 208. At the steps 207 and 208, the distance measuring action is performed respectively with other light emitting elements R2 and L2 continuously from the step 205. At the step 209, a measured distance value which is considered to be best representing a distance to a main object of shooting among the measured distance values obtained with the light emitting elements C, R1, L1, R2 and L2 is selected.

As described above, if the zoom position Zp is on the longer focal length side of the predetermined zoom position Zp1, the distance measuring action is performed at a less number of distance measuring points within a range corresponding to a photo-taking angle of view thus obtained. In this case, the number of times of light emission (to be repeated at each distance measuring point) per light emitting element is set to be larger than in a case where the zoom position Zp is on the shorter focal length side of the predetermined zoom position Zp1, so that a distance measuring capability can be adequately attained on the longer focal length side without lengthening a total period of time required for the multipoint distance measurement.

Second Embodiment

The first embodiment described above is arranged to enhance the distance measuring capability on the longer focal length side without lengthening the total distance measuring period of time required for the multipoint distance measurement by setting the number of times of light emission per light emitting element according to the zoom position.

A zoom camera according to a second embodiment of the invention is arranged to be applicable to a case where the distance measuring capability of the camera cannot be sufficiently enhanced for the focal length of the photo-taking optical system by the arrangement of the first embodiment. The arrangement of the zoom camera according to the second embodiment is the same as that of the first embodiment shown in FIG. 1.

In the zoom camera, it is highly probable that a main object of shooting desired by the user is located near to the central position of a photo-taking image plane when the focal length is 200 mm or above. Further, at such a focal length, the distance measuring targets of the light emitting elements R1 and L1 (shown in FIG. 1) come to be located either near the end of the photo-taking angle of view or outside the photo-taking angle of view.

In view of these points, in the second embodiment of the invention, the distance measuring action at such a long focal length is arranged to be performed only with the light emitting element C, so that the distance measuring capability is enhanced by increasing the number of times of light emission by the light emitting element C.

Figure 6:
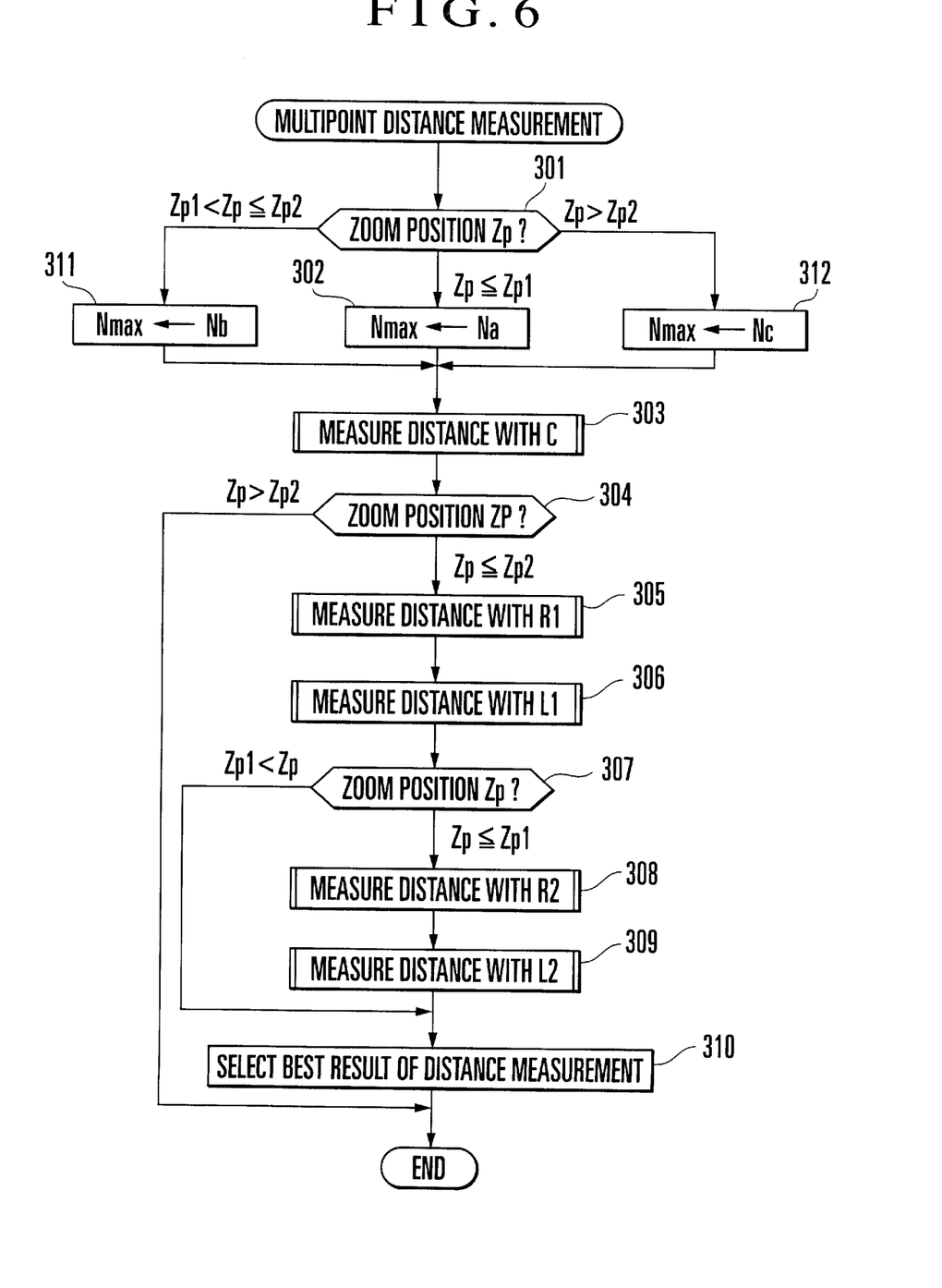
FIG. 6 is a flow chart showing the actions of essential parts of a multipoint distance measuring device according to the second embodiment of the invention.

FIG. 6 is a flow chart showing the actions of essential parts in the second embodiment.

At the step 301 of FIG. 6, a check is made for the current position of the zoom driving part 8b shown in FIG. 1, i.e., a zoom position Zp. If the zoom position Zp is found to be on the shorter focal length side of a predetermined zoom position Zp1, the flow proceeds to a step 302. At the step 302, the maximum number of times Nmax of light emission by each light emitting element is set to a first predetermined number of times Na. If the zoom position Zp is found to be on the longer focal length side of the predetermined zoom position Zp1 and on the shorter focal length side of another predetermined zoom position Zp2, the flow proceeds from the step 301 to a step 311. At the step 311, the maximum number of times Nmax of light emission by each light emitting element is set to a second predetermined number of times Nb. If the zoom position Zp is found to be on the longer focal length side of the predetermined zoom position Zp2, the flow proceeds from the step 301 to a step 312. At the step 312, the maximum number of times Nmax of light emission by each light emitting element is set to a third predetermined number of times Nc.

In this case, the predetermined zoom position Zp1 is assumed to be further on the shorter focal length side than the other predetermined zoom position Zp2.

The relation among the first predetermined number of times Na, the second predetermined number of times Nb and the third predetermined number of times Nc is expressed as "Na<Nb<Nc", which is set on the following conditions:

Nax(the number of distance measuring points to be used)≈Nbx (the number of distance measuring points to be used)   (3)

Nax(the number of distance measuring points to be used)≈Ncx(the number of distance measuring points to be used)   (4)

For example, in the second embodiment, if the zoom position Zp is on the shorter focal length side of the predetermined zoom position Zp1, the light emitting elements C, R1, L1, R2 and L2 are used for the distance measurement, so that the number of distance measuring points to be used is five. If the zoom position Zp is on the longer focal length side of the predetermined zoom position Zp1 but is on the shorter focal length side of the predetermined zoom position Zp2, the light emitting elements C, R1 and L1 are used for the distance measurement, so that the number of distance measuring points to be used is three. If the zoom position Zp is on the longer focal length side of the predetermined zoom position Zp2, the light emitting element C is alone used for the distance measurement, so that the number of distance measuring points to be used is only one. With this element applied to the formulas (3) and (4), the following relations are obtained:

from Formula (3),

Nax5≈Nbx3

Nb≈(5/3)×Na from Formula (4),

Nax5≈Ncx1

Nc≈5×Na

Therefore, the number of times of light emission per light emitting element when the zoom position Zp is on the longer focal length side of the predetermine zoom position Zp2 can be set to approximately five times as many as the number of times to be set when the zoom position Zp is on the shorter focal length side of the predetermined zoom position Zp1, i.e., the first predetermined number of times Na.

In the case of Formulas (3) and (4) above, the left and right terms are expressed to be approximately equal to each other (≈). However, as in the case of the first embodiment, these formulas may be changed to the following inequalities:

Nax(the number of distance measuring points to be used)≧Nbx (the number of distance measuring points to be used)   (3)'

Nax(the number of distance measuring points to be used)≧Ncx (the number of distance measuring points to be used)   (4)'

In the case of Formula (3)' and (4)' above, when the number of distance measuring points to be used is lessened, the number of times of light emission may be set according to a distance measuring capability required.

Figure 5B:
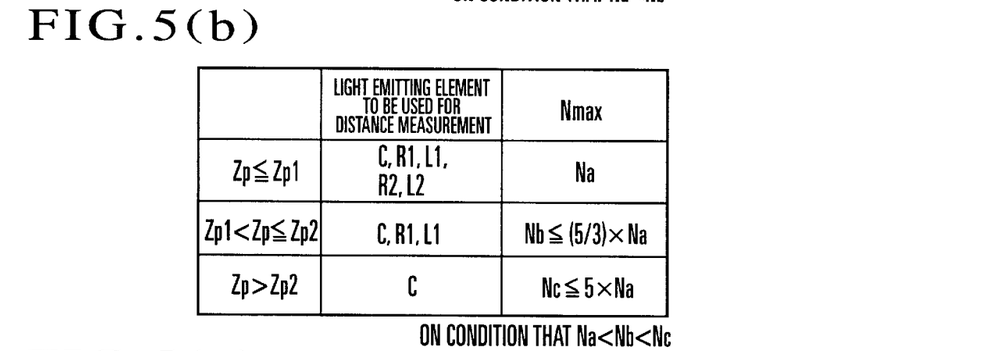

FIG. 5(b) shows the thus-obtained relationship of the light emitting elements to be used for the distance measurement and the number of times of light emission per light emitting element to the zoom position Zp.

At a step 303, the distance measuring action is performed with the light emitting element C of the light emitting element array 1. After that, the flow proceeds to a step 304. At the step 304, a check is made for the zoom position Zp. If the zoom position Zp is found to be on the longer focal length side of the predetermined zoom position Zp2, the distance measuring action is terminated. If the zoom position Zp is found to be on the shorter focal length side of the predetermined zoom position Zp2, the flow proceeds to steps 305 and 306 to perform the distance measuring action respectively with other light emitting elements R1 and L1 . At the next step 307, a check is made for the zoom position Zp by comparing it with the predetermined zoom position Zp1. If the zoom position Zp is found to be on the longer focal length side of the predetermined zoom position Zp1, the flow proceeds to a step 310 without performing the distance measuring action with the light emitting elements R2 and L2. At the step 310, a measured distance value which is considered to be best representing a distance to a main object of shooting among the measured distance values obtained with the light emitting elements C, R1 and L1 is selected. If the zoom position Zp is found at the step 307 to be on the shorter focal length side of the predetermined zoom position Zp1, the flow proceeds to steps 308 and 309. At the steps 308 and 309, the distance is measured respectively with the light emitting elements R2 and L2 continuously from the step 306. At the step 310, a measured distance value which is considered to be best representing a distance to a main object of shooting among the measured distance values obtained with the light emitting elements C, R1, L1, R2 and L2 is selected.

As described above, the zoom camera having the telephoto function according to the second embodiment is arranged to lessen the number of distance measuring points and to increase the number of times of light emission accordingly. This arrangement gives an adequate distance measuring capability without lengthening a total distance measuring period of time required in carrying out the multipoint distance measurement.

Third Embodiment

In the case of each of the first and second embodiments described above, the focal length of the photo-taking optical system is taken up as a factor having influence on the distance measuring capability of an active-type distance measuring device. This is because a maximum measurable distance must be increased accordingly as the focal length of the photo-taking optical system increases.

A shot noise due to external light (disturbance noise) is considered to be another factor influencing the distance measuring capability. If signal components are unvarying, the distance measuring capability lowers accordingly as the amount of external light increases within an area where the distance measuring capability is under the influence of a shot noise. In a case where the luminance of external light is very high to a limit of not saturating the output of the light receiving element 3, the distance measuring capability tends to become insufficient at every distance measuring point of the multipoint distance measurement.

Therefore, to improve the distance measuring capability of the zoom camera in respect of a shot noise, the third embodiment is arranged to inhibit measuring the distance at distance measuring points located closer to the outside of a multipoint distance measuring range and to attach importance to middle points located closer to the center of the multipoint distance measuring range by increasing the maximum number of times of light emission per light emitting element for the middle points. The third embodiment is thus arranged to be capable of giving a highly reliable measured distance value. The zoom camera according to the third embodiment is arranged in the same manner as the arrangement shown in FIG. 1.

Figure 7:
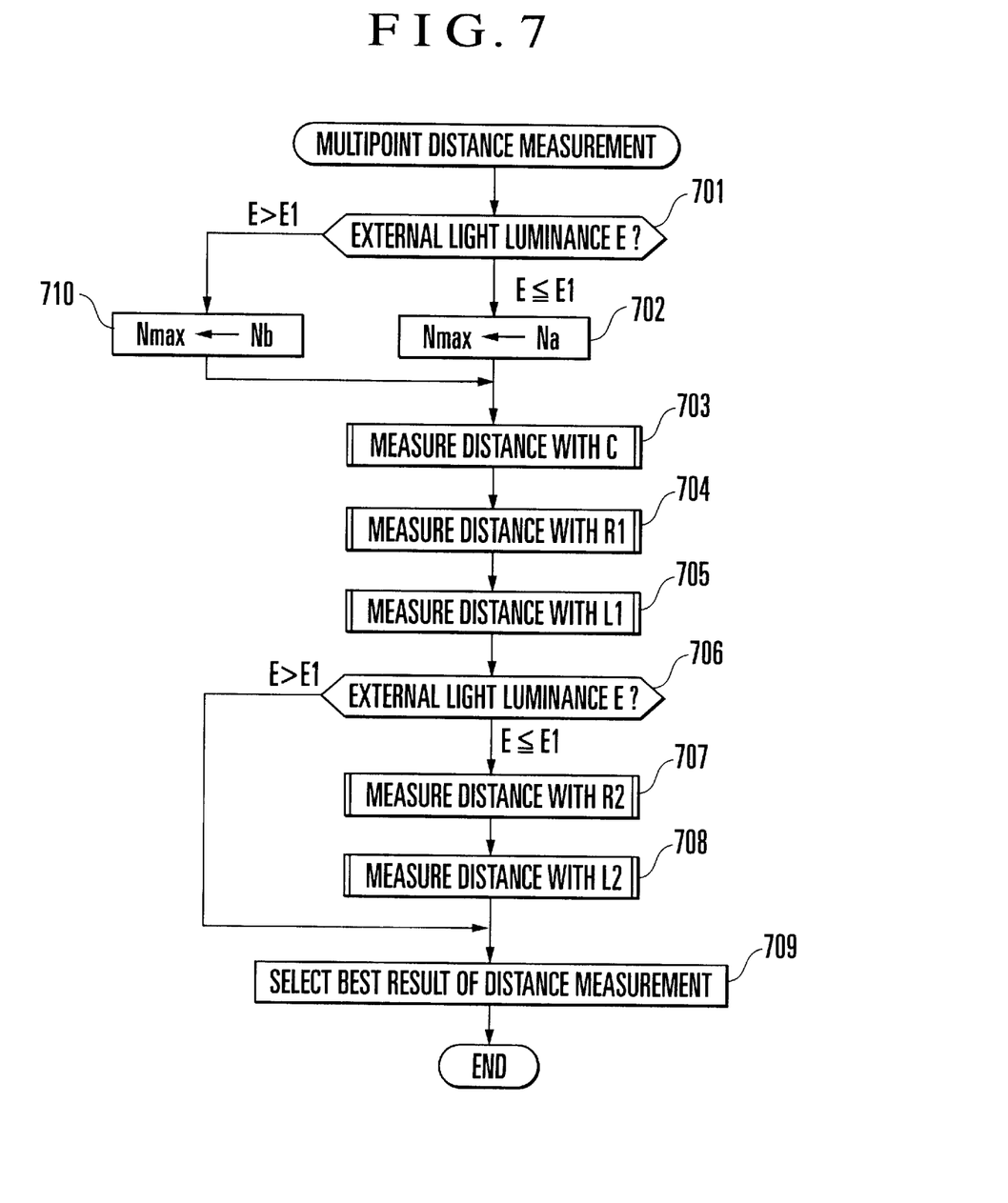
FIG. 7 is a flow chart showing the actions of essential parts of a multipoint distance measuring device according to the third embodiment of the invention.

FIG. 7 shows in a flow chart the actions of the essential parts in the third embodiment.

At the step 701 of FIG. 7, a check is made for the luminance of external light E by comparing it with a predetermined luminance value E1. The external light luminance E is either a measured light value obtained, for example, by the light measuring means 13 shown in FIG. 1 or an output of the light receiving element 3 obtained when the light emitting element array 1 is not lighted up. If the external light luminance E is found to be darker than the predetermined luminance value E1, the distance measuring capability is considered to be adequate, and the flow proceeds to a step 702. At the step 702, the maximum number of times Nmax of light emission by each light emitting element is set to a first predetermined number of times Na. If the external light luminance E is found to be brighter than the predetermined luminance value E1, the flow proceeds from the step 701 to a step 710. At the step 710, since the distance measuring capability is insufficient due to a shot noise in this instance, the maximum number of times Nmax of light emission by each light emitting element is set to a second predetermined number of times Nb, which is larger than the first predetermined number of times Na.

The first predetermined number of times Na and the second predetermined number of times Nb are set on the condition of the relation expressed by Formula (1). When the external light luminance E is brighter than the predetermined luminance value E1 in the camera arranged as shown in FIG. 1, therefore, the number of times of light emission per light emitting element can be set to approximately 1.7 times as many as the number of times to be set when the external light luminance E is darker than the luminance value E1.

Figure 5C:
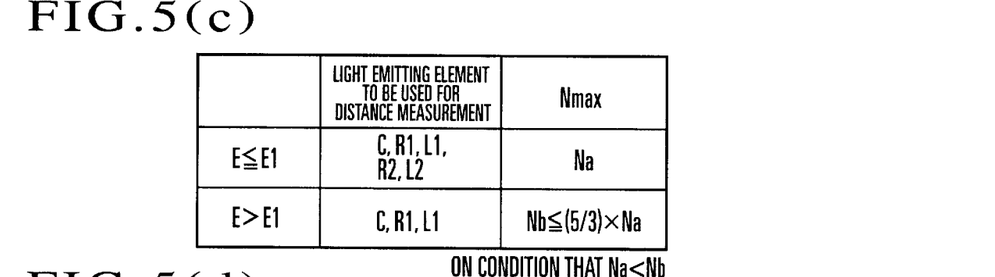

FIG. 5(c) shows the thus-obtained relationship of the light emitting elements to be used for the distance measurement and the number of times of light emission per light emitting element to the external light luminance E.

At a step 703, the distance is measured with the light emitting element C of the light emitting element array 1. At steps 704 and 705, the distance is measured respectively with other light emitting elements R1 and L1. At the next step 706, a check is made for the external light luminance E by comparing it with the predetermined luminance value E1. If the external light luminance E is found to be brighter than the predetermined luminance value E1, the flow proceeds to a step 709 without performing the distance measuring action with the light emitting elements R2 and L2. At the step 709, a measured distance value which is considered to be best representing a distance to a main object of shooting among the measured distance values obtained with the light emitting elements C, R1 and L1 is selected. The selection is made either by giving priority to a nearer distance or by attaching weight to the measured distance values and the distance measuring points. If the external light luminance E is found at the step 706 to be darker than the predetermined luminance value E1, the flow proceeds to steps 707 and 708. At the steps 707 and 708, the distance is measured respectively with the light emitting elements R2 and L2 continuously from the step 705. At the step 709, a measured distance value which is considered to be best representing a distance to a main object of shooting among the measured distance values obtained with the light emitting elements C, R1, L1, R2 and L2 is selected.

As described above, when the external light luminance E is brighter than the predetermined luminance value E1, the maximum number of times Nmax of light emission per light emitting element is set to be larger than when the external light luminance E is darker than the predetermined luminance value E1. Then, the number of distance measuring points to be used for distance measurement is lessened by inhibiting distance measurement from being made at the distance measuring points located closer to the outside of the distance measuring area (range) of the multipoint distance measuring device. By virtue of this arrangement of the third embodiment, the distance measuring capability can be saved from being insufficient over the whole area of distance measurement and can be made adequate at least at the distance measuring points located at the middle part of the distance measuring area.

Each of the first and second embodiments of the invention is arranged to lessen the number of distance measuring points according to the focal length of the photo-taking optical system and to have the adequate distance measuring capability by increasing the maximum number of times Nmax of light emission per light emitting element. In the case of the third embodiment, distance measurement at distance measuring points located closer to the outside of the distance measuring area is inhibited according to the luminance of external light of the object of shooting, and the distance measuring capability which then tends to be insufficient over the whole distance measuring area is made to be adequate at least for the distance measuring points located closer to the center of the distance measuring area by increasing the maximum number of times Nmax of light emission per light emitting element.

Figure 5D:
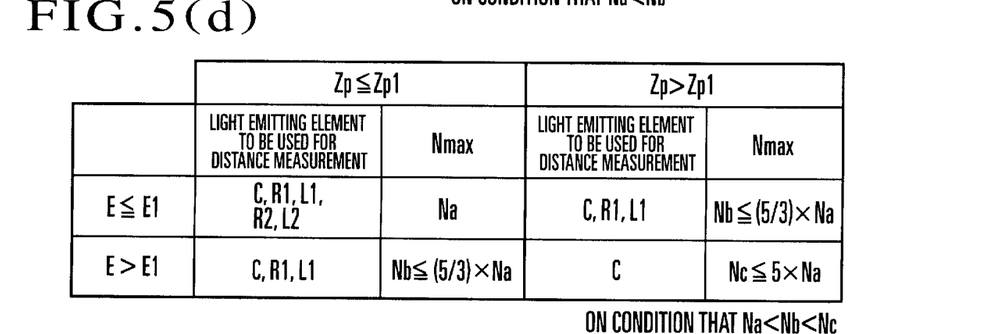

Further, it is possible to improve the insufficiency of the distance measuring capability due to both the focal length of the photo-taking optical system and the external light luminance of the object. In that case, the number of distance measuring points to be used and the maximum number of times Nmax of light emission per light emitting element are set according to the combination of the zoom position Zp and the external light luminance E, as shown in FIG. 5(d). The details of this modification are omitted from the description as the basic actions thereof are the same as those of the first, second and third embodiments.

In each of the embodiments described above, the light emitting element array is arranged to be composed of five light emitting elements. However, the invention is not limited to this number. The light emitting element array may be arranged to be composed of any suitable number of elements as long as it is at least two. The number of distance measuring points and the maximum number of times of light emission per light emitting element can be set according to the number of the light emitting elements.

In each of the embodiments described above, the light emitting element array is arranged in a one-dimensional manner. However, the light emitting element array may be arranged in a two-dimensional manner. In the case of the two-dimensional array, the necessary distance measuring capability can be obtained also by increasing the maximum number of times of light emission per light emitting element to be set according to the zoom position Zp or the external light luminance E.

While the light receiving element 3 shown in FIG. 1 has been described as a CCD array, the action of the light receiving element 3 can be carried out in the same manner as described above by arranging it as a PSD.

In the case of FIG. 1, the combination of the light emitting element array 1 and the light receiving element 3 is such that one light receiving element is arranged for five distance measuring elements. However, the invention is not limited to this arrangement. The combination of the light projecting and receiving elements and the distance measuring optical system may be arranged in any desired manner as long as they are arranged for an active-type multipoint distance measuring device.

Further, in each of the embodiments described above, the maximum number of times of light emission per light emitting element is arranged to vary according to the focal length or the external light luminance. However, the arrangement may be changed to increase a maximum value of a distance measuring period of time per distance measuring point or a maximum value of an electric-charge storing period of time (for limiting the electric-charge storing action) accordingly as the focal length is longer or accordingly as the luminance is higher.

What is claimed is:

1. An automatic focusing apparatus arranged to project light onto objects caught at a plurality of detecting areas in respective different directions, to receive, at a light receiving part, reflected light resulting from the light projection and to compute data for focusing on the basis of an output of the light receiving part resulting from the light projection on each object, said automatic focusing apparatus comprising:
    a varying circuit which varies the number of the detecting areas; and
    a setting circuit which sets a maximum period of time required for computing the data, according to the number of the detecting areas varied by said varying circuit.

2. An automatic focusing apparatus according to claim 1, wherein said setting circuit sets the maximum period of time required for computing the data to a shorter period of time when the number of the detecting areas varied by said varying circuit is a second number than when the number of the detecting areas varied by said varying circuit is a first number, the second number being larger than the first number.

3. An automatic focusing apparatus according to claim 1, wherein said varying circuit varies the number of the detecting areas according to focal length.

4. An automatic focusing apparatus according to claim 1, wherein said varying circuit varies the number of the detecting areas according to luminance.

5. An automatic focusing apparatus arranged to project light onto objects caught at a plurality of detecting areas in respective different directions, to receive, at a light receiving part, reflected light resulting from the light projection and to compute data for focusing on the basis of an output of the light receiving part resulting from the light projection on each object, said automatic focusing apparatus comprising:
    a light projecting circuit which causes the light projection to be repeatedly made on the object located at each of the detecting areas;
    a varying circuit which varies the number of the detecting areas; and
    a setting circuit which sets a maximum number of times of the light projection caused by said light projecting circuit for each detecting area, according to the number of the detecting areas varied by said varying circuit.

6. An automatic focusing apparatus according to claim 5, wherein said setting circuit sets the maximum number of times of the light projection to a smaller number of times when the number of the detecting areas varied by said varying circuit is a second number than when the number of the detecting areas varied by said varying circuit is a first number, the second number being larger than the first number.

7. An automatic focusing apparatus according to claim 5, wherein said varying circuit varies the number of the detecting areas according to focal length.

8. An automatic focusing apparatus according to claim 5, wherein said varying circuit varies the number of the detecting areas according to luminance.

9. An automatic focusing apparatus arranged to project light onto objects caught at a plurality of detecting areas in respective different directions, to receive, at a signal-storing-type light receiving part, reflected light resulting from the light projection and to compute data for focusing on the basis of an output of the light receiving part resulting from the light projection on each object, said automatic focusing apparatus comprising:
    a varying circuit which varies the number of the detecting areas; and
    a setting circuit which sets a maximum period of time for storing a signal at the light receiving part, according to the number of the detecting areas varied by said varying circuit.

10. An automatic focusing apparatus according to claim 9, wherein said setting circuit sets the maximum period of time to a shorter period of time when the number of the detecting areas varied by said varying circuit is a second number than when the number of the detecting areas varied by said varying circuit is a first number, the second number being larger than the first number.

11. An automatic focusing apparatus according to claim 9, wherein said varying circuit varies the number of the detecting areas according to focal length.

12. An automatic focusing apparatus according to claim 9, wherein said varying circuit varies the number of the detecting areas according to luminance.

13. A multipoint distance measuring device, comprising:
    a plurality of light emitting elements arranged to project light toward a distance measuring object;
    a light receiving element arranged to receive reflected light from the distance measuring object resulting from the light projection by each of said plurality of light emitting elements so as to generate output signals correspondingly with said plurality of light emitting elements;
    computing means for computing distance measurement information by executing a distance measuring action respectively at a plurality of distance measuring points independently of each other; and
    control means for deciding the number of distance measuring points to be used for executing the distance measuring action, according to a state of focal length of a focal-length-variable optical system, and for setting a maximum number of times of light emission by each light emitting element at the associated distance measuring point, according to the number of distance measuring points decided.

14. A multipoint distance measuring device according to claim 13, wherein said control means makes smaller the number of distance measuring points to be used for executing the distance measuring action and sets larger the maximum number of times of light emission by each light emitting element at the associated distance measuring point, when the focal length of the optical system is longer than a predetermined focal length than when the focal length of the optical system is shorter than the predetermined focal length.

15. A multipoint distance measuring device, comprising:
    a plurality of light emitting elements arranged to project light toward a distance measuring object;

a light receiving element arranged to receive reflected light from the distance measuring object resulting from the light projection by each of said plurality of light emitting elements so as to generate output signals correspondingly with said plurality of light emitting elements;

computing means for computing distance measurement information by executing a distance measuring action respectively at a plurality of distance measuring points independently of each other; and control means for deciding the number of distance measuring points to be used for executing the distance measuring action, according to a state of output of light measuring means, and for setting a maximum number of times of light emission by each light emitting element at the associated distance measuring point, according to the number of distance measuring points decided.

16. A multipoint distance measuring device according to claim 15, wherein said control means makes smaller the number of distance measuring points to be used for executing the distance measuring action and sets larger the maximum number of times of light emission by each light emitting element at the associated distance measuring point, when the output of said light measuring means indicates that external light is brighter than a predetermined luminance value than when the output of said light measuring means indicates that external light is darker than the predetermined luminance value.

17. A multipoint distance measuring device, comprising:

a plurality of light emitting elements arranged to project light toward a distance measuring object;

a light receiving element arranged to receive reflected light from the distance measuring object resulting from the light projection by each of said plurality of light emitting elements so as to generate output signals correspondingly with said plurality of light emitting elements;

computing means for computing distance measurement information by executing a distance measuring action respectively at a plurality of distance measuring points independently of each other; and control means for deciding the number of distance measuring points to be used for executing the distance measuring action, according to a state of focal length of a focal-length-variable optical system and a state of output of light measuring means, and for setting a maximum number of times of light emission by each light emitting element at the associated distance measuring point, according to the number of distance measuring points decided.

18. A multipoint distance measuring device according to any one of claims 13, 15 and 17, wherein a value obtained by multiplying the number of distance measuring points to be used for executing the distance measuring action by the maximum number of times of light emission by each light emitting element at the associated distance measuring point is approximately constant irrespective of the number of distance measuring points to be used for executing the distance measuring action.

19. A multipoint distance measuring device according to any one of claims 13, 15 and 17, wherein a value obtained by multiplying the number of distance measuring points to be used for executing the distance measuring action by the maximum number of times of light emission by each light emitting element at the associated distance measuring point becomes a maximum value when the number of distance measuring points to be used for executing the distance measuring action is largest.

20. A camera comprising:

a multipoint distance measuring device, including a plurality of light emitting elements arranged to project light toward a distance measuring object, a light receiving element arranged to receive reflected light from the distance measuring object resulting from the light projection by each of said plurality of light emitting elements so as to generate output signals correspondingly with said plurality of light emitting elements, and computing means for computing distance measurement information by executing a distance measuring action respectively at a plurality of distance measuring points independently of each other;

a photo-taking optical system having a variable focal length; and control means for deciding the number of distance measuring points to be used for executing the distance measuring action, according to a state of focal length of said photo-taking optical system, and for setting a maximum number of times of light emission by each light emitting element at the associated distance measuring point, according to the number of distance measuring points decided.

21. A camera comprising:

a multipoint distance measuring device, including a plurality of light emitting elements arranged to project light toward a distance measuring object, a light receiving element arranged to receive reflected light from the distance measuring object resulting from the light projection by each of said plurality of light emitting elements so as to generate output signals correspondingly with said plurality of light emitting elements, and computing means for computing distance measurement information by executing a distance measuring action respectively at a plurality of distance measuring points independently of each other;

light measuring means for measuring luminance of a field of view; and control means for deciding the number of distance measuring points to be used for executing the distance measuring action, according to a state of output of said light measuring means, and for setting a maximum number of times of light emission by each light emitting element at the associated distance measuring point, according to the number of distance measuring points decided.

22. A camera comprising:

a multipoint distance measuring device, including a plurality of light emitting elements arranged to project light toward a distance measuring object, a light receiving element arranged to receive reflected light from the distance measuring object resulting from the light projection by each of said plurality of light emitting elements so as to generate output signals correspondingly with said plurality of light emitting elements, and computing means for computing distance measurement information by executing a distance measuring action respectively at a plurality of distance measuring points independently of each other;

a photo-taking optical system having a variable focal length;

light measuring means for measuring luminance of a field of view; and control means for deciding the number of distance measuring points to be used for executing the distance measuring action, according to a state of focal length of said photo-taking optical system and a state of output of said light measuring means, and for setting a maximum number of times of light emission by each light emitting element at the associated distance measuring point, according to the number of distance measuring points decided.

* * * * *

UNITED STATES PATENT AND TRADEMARK OFFICE
CERTIFICATE OF CORRECTION

PATENT NO. : 6,381,413 B1
DATED : April 30, 2002
INVENTOR(S) : Osamu Harada

It is certified that error appears in the above-identified patent and that said Letters Patent is hereby corrected as shown below:

<u>Title page,</u>
Item [30], delete "Aug. 2, 1999" and insert -- Aug. 12, 1999 --.

<u>Column 3,</u>
Line 55, delete "invention" and insert -- invention. --.

<u>Column 5,</u>
Line 18, delete "12a" and insert -- 12b --.

Signed and Sealed this

Third Day of December, 2002

JAMES E. ROGAN
*Director of the United States Patent and Trademark Office*